(12) United States Patent
Hofstätter et al.

(10) Patent No.: US 12,440,819 B2
(45) Date of Patent: Oct. 14, 2025

(54) REACTOR AND METHOD FOR CARRYING OUT A CHEMICAL REACTION

(71) Applicants: LINDE GMBH, Pullach (DE); BASF SE, Ludwigshafen (DE)

(72) Inventors: Martin Hofstätter, Munich (DE); Mathieu Zellhuber, Martinsried (DE); Peter Reiser, Münsing (DE); Georg Kiese, Zorneding (DE); Christian Ziegler, Munich (DE); Robert Stegemann, Munich (DE); Jens Aengenheister, Pullach (DE); Jürgen Feigl, Pullach (DE); Anton Wellenhofer, Hohenschäftlarn (DE); Clara Delhomme-Neudecker, Munich (DE); Andrey Shustov, Ludwigshafen am Rhein (DE); Eric Jenne, Hassloch (DE); Kiara Aenne Kochendörfer, Mannheim (DE); Heinrich Laib, Limburgerhof (DE); Heinz-Jürgen Kühn, Westhofen (DE); Reiner Jacob, Hochspeyer (DE)

(73) Assignee: Linde GmbH, Pullach (DE)

(*) Notice: Subject to any disclaimer, the term of this patent is extended or adjusted under 35 U.S.C. 154(b) by 534 days.

(21) Appl. No.: 17/996,525

(22) PCT Filed: Apr. 22, 2021

(86) PCT No.: PCT/EP2021/060599
§ 371 (c)(1),
(2) Date: Oct. 19, 2022

(87) PCT Pub. No.: WO2021/214256
PCT Pub. Date: Oct. 28, 2021

(65) Prior Publication Data
US 2023/0226511 A1    Jul. 20, 2023

(30) Foreign Application Priority Data
Apr. 23, 2020  (EP) .................................... 20171182

(51) Int. Cl.
*B01J 19/00*    (2006.01)
*B01J 8/06*     (2006.01)
*B01J 19/08*    (2006.01)

(52) U.S. Cl.
CPC ............. *B01J 19/002* (2013.01); *B01J 8/067* (2013.01); *B01J 19/0013* (2013.01); *B01J 19/087* (2013.01); *B01J 2219/00049* (2013.01)

(58) Field of Classification Search
CPC .. B01J 8/067; B01J 8/062; B01J 2208/00628; B01J 2208/00637; B01J 2208/065;
(Continued)

(56) References Cited

U.S. PATENT DOCUMENTS 1,985,680 A    12/1934   Mapes
5,204,071 A    4/1993    Carter et al.
(Continued)

FOREIGN PATENT DOCUMENTS

CN    101150894 A    3/2008
DE    2362628 A1     6/1975
(Continued)

OTHER PUBLICATIONS

Notice of Opposition received in Application No. EP21719925.6, dated Jul. 25, 2024.
(Continued)

*Primary Examiner* — Lessanework Seifu
(74) *Attorney, Agent, or Firm* — Avek IP, LLC (57) ABSTRACT

A reactor has a reactor vessel and one or more reaction tubes. One or more power input elements are guided into the reactor vessel for the electrical heating of the reaction
(Continued)

tube(s). The one or more power input elements each have a rod-shaped section, and the rod-shaped section(s) each run in a respective wall passage through a wall of the reactor vessel. A connection chamber into which the rod-shaped section(s) project is arranged outside the reactor vessel and adjacent to the wall of the reactor vessel through which the rod-shaped section(s) run in their wall passages. Gas feed means apply an inerting gas to the connection chamber, and the wall passages with the rod-shaped sections received therein in a longitudinally-movable manner are designed to be gas-permeable so that at least a portion of the inerting gas fed into the connection chamber flows out into the reactor vessel.

18 Claims, 6 Drawing Sheets

(58) Field of Classification Search
CPC ...... B01J 2208/00389; B01J 2219/0803; B01J 2219/00637; B01F 19/2425; B01F 19/002; B01F 19/087
See application file for complete search history.

(56) References Cited

U.S. PATENT DOCUMENTS

| | | |
|---|---|---|
| 6,191,332 B1 | 2/2001 | Duee et al. |
| 6,296,814 B1 | 10/2001 | Bonk et al. |
| 9,347,596 B2 | 5/2016 | Wortmann et al. |
| 9,908,091 B2 | 3/2018 | Vogel et al. |
| 2004/0015012 A1 | 1/2004 | Hammon et al. |
| 2010/0105944 A1 | 4/2010 | Buturla et al. |
| 2012/0241677 A1 | 9/2012 | Perkins et al. |
| 2012/0328269 A1 | 12/2012 | Ellinger et al. |
| 2014/0238523 A1 | 8/2014 | Wortmann et al. |
| 2015/0010467 A1 | 1/2015 | Ito et al. |
| 2015/0122802 A1 | 5/2015 | Zikeli et al. |
| 2016/0288074 A1 | 10/2016 | Vogel et al. |
| 2018/0208525 A1 | 7/2018 | Schoonebeek et al. |
| 2019/0002389 A1 | 1/2019 | Horstmann et al. |
| 2020/0299131 A1 | 9/2020 | Finnerty et al. |
| 2021/0071007 A1 | 3/2021 | Hardman et al. |
| 2021/0179948 A1 | 6/2021 | Kochendoerfer et al. |
| 2023/0115461 A1 | 4/2023 | Zellhuber et al. |
| 2023/0116690 A1 | 4/2023 | Posselt et al. |
| 2023/0211305 A1 | 7/2023 | Hofstätter et al. |
| 2023/0226511 A1 | 7/2023 | Hofstätter et al. |
| 2023/0285929 A1 | 9/2023 | Posselt et al. |
| 2023/0302426 A1 | 9/2023 | Zellhuber et al. |
| 2023/0356176 A1 | 11/2023 | Lang et al. |
| 2023/0398513 A1 | 12/2023 | Hofstatter et al. |
| 2024/0100498 A1 | 3/2024 | Hofstatter et al. |
| 2024/0123421 A1 | 4/2024 | Zellhuber et al. |
| 2024/0207811 A1 | 6/2024 | Zellhuber et al. |

FOREIGN PATENT DOCUMENTS

| | | |
|---|---|---|
| DE | 102011077970 A1 | 12/2012 |
| DE | 102015004121 A1 | 10/2016 |
| DE | 102018132736 A1 | 6/2020 |
| EP | 0399833 A1 | 11/1990 |
| EP | 0792683 A2 | 9/1997 |
| EP | 1043367 A1 | 10/2000 |
| EP | 1273552 A2 | 1/2003 |
| EP | 2805762 A1 | 11/2014 |
| EP | 3075704 A1 | 10/2016 |
| EP | 3153466 A1 | 4/2017 |
| EP | 3862076 A1 | 8/2021 |
| EP | 3900817 A1 | 10/2021 |
| EP | 4056892 A1 | 9/2022 |
| JP | S49010026 A | 1/1974 |
| JP | S5223246 A | 2/1977 |
| JP | S57144840 A | 9/1982 |
| JP | S6099951 A | 6/1985 |
| JP | S60191444 A | 9/1985 |
| JP | H05317843 A | 12/1993 |
| JP | H06104187 A | 4/1994 |
| JP | H1053775 A | 2/1998 |
| JP | H1094727 A | 4/1998 |
| JP | 2006261362 A | 9/2006 |
| JP | 2008221093 A | 9/2008 |
| JP | 2009526734 A | 7/2009 |
| JP | 2011258392 A | 12/2011 |
| JP | 2013067537 A | 4/2013 |
| JP | 2016087512 A | 5/2016 |
| PL | 175410 B1 | 5/1995 |
| RU | 2173213 C1 | 9/2001 |
| WO | 2004091773 A1 | 10/2004 |
| WO | 2015069762 A2 | 5/2015 |
| WO | 2015123578 A1 | 8/2015 |
| WO | 2015197181 A1 | 12/2015 |
| WO | 2017072057 A1 | 5/2017 |
| WO | 2019133215 A1 | 7/2019 |
| WO | 2019228798 A1 | 12/2019 |
| WO | 2020002326 A1 | 1/2020 |
| WO | 2020035575 A1 | 2/2020 |
| WO | 2022214622 A1 | 10/2022 |

OTHER PUBLICATIONS

Substantive examination report with English description, dated Aug. 15, 2024, 10 pages, issued in Saudi Arabia Application No. 523450274.
Waitz and Wubben "Resistance heated furnaces for protective gas and vacuum operation" from Heat Processing (9), Issue 1, 2011, p. 29-38.
International Search Report issued in related App. No. PCT/EP2021/060599, dated Aug. 13, 2021.

REACTOR AND METHOD FOR CARRYING OUT A CHEMICAL REACTION

CROSS-REFERENCE TO RELATED APPLICATIONS

This application is the national phase of, and claims priority to, International Application No. PCT/EP2021/060599, filed Apr. 22, 2021, which claims priority to European Application No. 20171182.7, filed Apr. 23, 2020, the disclosure of each of which is incorporated by reference herein in its entirety.

FIELD OF THE INVENTION

The invention relates to a reactor and a method for carrying out a chemical reaction according to the preambles of the independent claims.

BACKGROUND

In a number of processes in the chemical industry, reactors are used in which one or more reactants are passed through heated reaction tubes and catalytically or non-catalytically reacted there. The heating serves in particular to overcome the activation energy required for the chemical reaction that is taking place. The reaction can proceed as a whole endothermically or, after overcoming the activation energy, exothermically. The invention relates in particular to strongly endothermic reactions.

Examples of such processes are steam cracking, various reforming processes—in particular, steam reforming, dry reforming (carbon dioxide reforming), mixed reforming processes, processes for dehydrogenating alkanes, and the like. In steam cracking, the reaction tubes are guided through the reactor in the form of coils, which have at least one U-bend in the reactor, whereas tubes running through the reactor without a U-bend are typically used in steam reforming.

The invention is suitable for all such processes and designs of reaction tubes. The articles, "Ethylene," "Gas production," and "Propene," in Ullmann's Encyclopedia of Industrial Chemistry, e.g., the publications dated Apr. 15, 2009, DOI: 10.1002/14356007.a10_045.pub2, dated Dec. 15, 2006, DOI: 10.1002/14356007.a12_169.pub2, and dated Jun. 15, 2000, DOI: 10.1002/14356007.a22_211, are referred to here purely for illustrative purposes.

The reaction tubes of corresponding reactors are conventionally heated using burners. In this case, the reaction tubes are routed through a combustion chamber in which the burners are also arranged.

However, as described, for example, in DE 10 2015 004 121 A1 (likewise EP 3 075 704 A1), the demand for synthesis gas and hydrogen which are produced with or without reduced local carbon dioxide emissions is, for example, currently increasing. However, this demand cannot be met by processes in which fired reactors are used, due to the combustion, typically, of fossil energy carriers. Other processes are ruled out—for example, due to high costs. The same also applies to the provision of olefins and/or other hydrocarbons by steam cracking or the dehydrogenation of alkanes. In such cases, too, there is a desire for processes that, at least on-site, emit lower amounts of carbon dioxide.

Against this background, the aforementioned DE 10 2015 004 121 A1 proposes an electrical heating of a reactor for steam reforming in addition to a firing. In this case, one or more voltage sources are used which provide a three-phase alternating voltage on three external conductors. Each external conductor is connected to a reaction tube. A star circuit is formed in which a star point is realized by a collector into which the pipelines open and to which the reaction tubes are conductively connected. In this way, the collector ideally remains potential-free. In relation to the vertical, the collector is arranged below and outside the combustion chamber, and preferably extends transversely to the reaction tubes or along the horizontal. WO 2015/197181 A1 likewise discloses a reactor whose reaction tubes are arranged in a star-point circuit.

In addition to the direct heating of reaction tubes, with which a current flows through the reaction tubes, there are also a wide variety of concepts for the indirect electrical heating of reaction tubes. Indirect electrical heating can take place, as described, inter alia, in WO 2020/002326 A1, in the form of external electrical heating. Internal heating is also possible, as disclosed in WO 2019/228798 A1, for example. In addition to resistance or impedance heating, inductive electrical heating of reaction tubes or a catalyst bed, as described in WO 2017/072057 A1, for example, can take place. Inductive heating can, for example, heat an internal or external heating element, or the reaction tubes themselves. Direct (non-inductive) heating of a reaction tube is also disclosed in DE 10 2015 004 121 A1. For heating, basic concepts with polyphase or single-phase alternating current or with direct current can be realized. In the case of direct heating of reactors by means of direct current or also with single-phase alternating current, no star circuit with a potential-free star point can be realized, but the power input can basically be realized in a similar manner. The present invention is suitable for all variants of electrical heating.

WO 2004/091773 A1 describes an electrically-heated reactor for carrying out gas reactions at high temperature. The reactor consists of a reactor block, of one or more monolithic modules of a material suitable for electrical heating, which modules are surrounded by a housing, of channels that extend through the module(s) and are designed as reaction channels, and of a device for conducting or inducing a current in the reactor block. The safety during operation of such a reactor is to be increased in that the housing of the reactor block has a double-walled jacket, which seals said reactor block in a gas-tight manner, and at least one device for feeding an inerting gas into the double-walled jacket.

As also explained below, special safety-relevant aspects must be observed in the case of electrically-heated reactors. The object of the present invention is to specify measures that take these aspects into account and in this way allow advantageous operation of an electrically-heated reactor.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to an embodiment, a reactor for carrying out a chemical reaction includes a reactor vessel; and one or more reaction tubes. One or more power input elements are guided into the reactor vessel for electrical heating of the one or more reaction tubes. The one or more power input elements each have a rod-shaped section, and the rod-shaped section or sections each run in a respective wall passage through a wall of the reactor vessel. A connection chamber into which the rod-shaped section(s) project is located outside the reactor vessel and adjacent to the wall of the reactor vessel in which the wall passage(s) are formed. Gas feed means are provided, which are set up to apply inerting gas to the connection chamber. The wall passage(s) with the rod-shaped section(s) received therein in a longitudinally-movable manner are designed to be gas-permeable so that at least a portion of the inerting gas fed into the connection chamber flows into the reactor vessel.

In another embodiment, a method for carrying out a chemical reaction includes providing a reactor having a reactor vessel; and one or more reaction tubes, and carrying out a reaction utilizing the reactor. One or more power input elements are guided into the reactor vessel for electrical heating of the one or more reaction tubes. The one or more power input elements each have a rod-shaped section, and the rod-shaped section or section(s) each run in a respective wall passage through a wall of the reactor vessel. A connection chamber into which the rod-shaped section(s) project is located outside the reactor vessel and adjacent to the wall of the reactor vessel in which the wall passage(s) are formed. Gas feed means are configured to apply inerting gas to the connection chamber. The wall passage(s) with the rod-shaped section(s) received therein in a longitudinally-movable manner are designed to be gas-permeable so that at least a portion of the inerting gas fed into the connection chamber flows into the reactor vessel.

WRITTEN DESCRIPTION

Against this background, the invention proposes a reactor and a method for carrying out a chemical reaction according to the preambles of the independent claims. Embodiments are the subject matter of the dependent claims and the following description.

In the electrified furnace concept (the term, "furnace," is commonly understood to denote a corresponding reactor or at least its thermally-insulated reaction space) that is the basis of the invention, reaction tubes, for example, or corresponding tube sections thereof (hereafter also referred to in short as "tubes") are themselves used as electrical resistors in order to generate heat. This approach has the advantage of a greater efficiency compared to indirect heating by external electric heating elements, as well as a higher attainable heat flux density. However, as mentioned at the outset, it is also possible to carry out any other type of electrical heating (directly or indirectly, in the form of resistance, impedance, or induction heating, by means of a single-phase or polyphase alternating current or with direct current) within the scope of the invention, if said heating proves to be advantageous.

In the case of heating with polyphase alternating current, the current is fed into the directly-heated reaction tubes via M separately connected phases. The current-conducting reaction tubes connected to the M phases may also be electrically connected to a star point. The number of phases M is in particular 3, corresponding to the number of phases of conventional three-phase current sources or networks. In principle, however, the present invention is not restricted to the use of three phases, but can also be used with a larger number of phases, e.g., a phase number of 4, 5, 6, 7, or 8. A phase offset is in particular 360°/M, i.e., 120° for a three-phase current.

In electrical heating with polyphase alternating current, potential equalization between the phases is achieved by the star circuit at the star point, which makes electrical insulation of the connected pipelines superfluous. This represents a particular advantage of such a furnace concept, since a break in the metallic reaction tubes for insulating certain sections is undesirable-particularly because of the high temperatures used and the high material and construction outlay thus required.

However, the measures proposed according to the invention and explained below are suitable in the same way for the use of single-phase alternating current and direct current, and the invention can be used both in reactors heated with alternating current and in reactors heated with direct current, or also in corresponding mixed forms. As mentioned, the invention is also suitable for use in indirectly-heated reaction tubes. In the case of a direct current arrangement, only the type of the current source and the region of the reaction tubes opposite to the power input or corresponding sections supplied with current are, for example, different from an alternating current arrangement. In the latter, an electrical connection of different tube sections is only optionally carried out. Since a potential-free star point is not present in a direct current arrangement, suitable current discharge elements are to be provided, which safely conduct the current flow back to the outside. The latter can be designed analogously to the power inputs described below.

In the terminology of the claims, the invention relates to a reactor for carrying out a chemical reaction, which has a reactor vessel (i.e., a thermally-insulated or at least partially insulated region) and one or more reaction tubes, wherein one or more power input elements for electrical heating of the reaction tube(s) is or are guided into the reactor vessel. According to the invention, the power input element has a rod-shaped section, or several power input elements each have a rod-shaped section, wherein the rod-shaped section(s) run in a wall passage or respectively in a wall passage through a wall of the reactor vessel.

Within the scope of the invention, a connection chamber into which the rod-shaped sections project is arranged outside the reactor vessel and adjacent to the wall through which the rod-shaped section(s) of the current input element(s) run, i.e., in which the wall passage(s) is or are formed. The rod-shaped sections (hereafter, the plural is used only for simplification, but without any resulting intended restriction; however, the explanations apply in the same manner to individually present elements) are connected in the connection chamber—in particular, to flexible contact elements—e.g., to strands, power strips, lamellar strips, or current springs, e.g., also via suitable intermediate sections or intermediate elements. These flexible contact elements are fastened with an end, which is not connected to the rod-shaped sections, to rigid contact elements, which are typically arranged immovably in the connection chamber, e.g., in a manner insulated in a wall, and are supplied, for example, by a DC or AC transformer. The flexible contact elements compensate for the longitudinal movement of the rod-shaped sections in the wall passages. In other words, the rod-shaped sections are received in the wall passages in a longitudinally-movable manner.

Within the scope of the invention, the wall passages with the rod-shaped sections received therein in a longitudinally-movable manner are designed to be gas-permeable, i.e., a certain transfer of gas from the reactor vessel into the connection chamber can take place, and vice versa.

According to the invention, an inerting gas, which is fed at least in part into the connection chamber and flows out through the wall passages into the reactor vessel, is applied to the connection chamber by correspondingly set up gas feed means—for example, comprising feed nozzles or openings, lines, and a gas reservoir connected thereto. The inerting gas is at least partially fed into the connection chamber. The feed into the connection chamber causes the advantageous effects that the connection chamber is flushed, an additional cooling effect is achieved in the connection chamber, and a flushing flow which is as directed as possible in the reactor vessel is achieved from bottom to top. Further feed points can be provided at any point, e.g., in order to further improve the flushing flow in the reactor vessel—in particular, in order to avoid dead zones in which oxygen may accumulate.

The invention is further described below with reference to embodiments in which a number of tube sections of the one or more reaction tubes run in each case between a first region and a second region within the reactor vessel and through an intermediate region between the first and the second region, and wherein the tube sections in the first region for electrical heating of the tube sections are each electrically connected or connectable to one or more power connections of a power source, viz., in the case of a direct current arrangement, to one or more direct current connections, and in the case of an alternating current arrangement, to the phase connections ("outer conductors") of a polyphase alternating current source, as explained in detail below. In alternatively likewise possible indirect heating, which can also be used as mentioned, connecting elements for corresponding heating devices are guided through the wall of the reactor vessel.

As mentioned, in a corresponding embodiment of the invention, a respective alternating voltage is in this case provided by means of an alternating current arrangement via the phase connections, and the alternating voltages of the phase connections are phase-shifted in the manner explained above. For example, a supply network or a suitable generator and/or transformer can serve as an alternating current source. The tube sections form a star circuit in which they are electrically conductively coupled to one another at their respective opposite end to the current supply, i.e., in the second region.

In the case of a direct current arrangement, on the other hand, in other embodiments, the same or different static electrical potentials are fed via one or more direct current connections, and current withdrawal elements are provided at the respective end opposite the power input. The same applies in a comparable manner when using a single-phase alternating current from one or more current sources.

In the intermediate region, the tube sections in the mentioned embodiment of the invention run through the reactor vessel particularly freely, i.e., without mechanical support, without electrical contacting, and/or without fluidic or purely mechanical cross-connections to one another. In this embodiment, they, in particular, run substantially or entirely straight in the intermediate region, wherein "substantially straight" is to be understood as meaning that an angular deviation of less than 10° or 5° is present.

The cleavage reactions in steam cracking in particular are strongly endothermic reactions. For the provision of the necessary energy for the reaction by means of direct heating (ohmic resistance), high current intensities are therefore required, which are provided in the aforementioned reactor concept by one or more transformers placed outside the reactor.

In all the aforementioned concepts of electrical heating, the electrical current must be conducted with the lowest possible losses (low electrical resistance) from the outside into the interior of the thermally-insulated reactor and to the process-conducting regions.

In order to reduce the thermal losses and thus to achieve a high system efficiency, it is imperative to place the electrically-heated reaction tubes in an insulated box (referred to here as the reactor vessel). When penetrating the thermally-insulated wall of the reactor vessel, the current conductor must overcome a quasi-adiabatic zone without impermissibly high local temperatures occurring in these regions.

Therefore, within the scope of the particularly preferred embodiment of the invention just explained, power input arrangements to which a respective tube section or a respective group of the tube sections is electrically connected are provided in the first region of the reactor, i.e., in the region of the power input. The tube sections are provided in such a number that a respective one or a respective group of several tube section(s) can be connected to a respective one of the power input arrangements, and vice versa. The number of power input arrangements provided within the scope of the invention depends upon the number of phase connections of the polyphase alternating current source in the case of an alternating current arrangement, or this number corresponds to the number of direct current connections.

The power input elements each have at least one of the mentioned rod-shaped sections, each of which runs through the wall of the reactor vessel in its wall passage. In contrast to strands or the like, for example, the rod-shaped section in all embodiments of the present invention is in particular formed in one piece (i.e., in particular, not in the form of parallel or braided wires). It can be designed to be solid or at least partially tubular, i.e., as a hollow rod. The rod-shaped section has a longitudinal extension that is perpendicular to the wall of the reactor vessel and at least twice as large—in particular, at least three times, four times, or five times and, for example, up to ten times as large—as a largest transverse extension parallel to the wall of the reactor vessel. The rod-shaped section can, for example, be round, oval, or triangular or polygonal in cross-section, or have any other shape.

In all embodiments of the invention, the inerting gas can be a gas or a gas mixture that has nitrogen, carbon dioxide, and/or argon in a respectively superatmospheric content, or the gas feed means are set up to provide a corresponding inerting gas. In particular, the content can be more than 50%, 60%, 70%, 80%, or 90%. It, therefore, does not have to be a pure "inert gas" in the traditional sense; rather, it is sufficient if the inerting gas—in particular, due to its content of a non-combustible gas—at least partially reduces the flammable range of the mixture, i.e., reduces the risk of ignition, explosion, or detonation. An inerting gas for use within the framework of the present invention can in particular have a subatmospheric oxygen content—for example, an oxygen content of less than 10%, 5%, 1%, 0.5%, or 0.1%. An inerting gas can also be (substantially) oxygen-free.

With the feeding of inerting gas carried out according to the invention, the invention enables the rod-shaped sections of the power input elements to be movably received in the wall of the reactor vessel without requiring a gas-tight seal, as would otherwise be necessary in order to avoid escape of combustible gases into the environment—for example, when the reaction tubes are damaged ("coil shredder"). Within the scope of the invention, the wall passages can therefore be significantly more compact and, because sealing materials are dispensed with, permanent. It is advantageous here that all components exiting from the connection chamber to the environment now have very small compensation movements, so that the implementation of gas tightness with respect to the reactor vessel wall itself is here significantly simplified.

Coil shredders are less of a safety-related problem in conventional, fired reactors than in purely electrically-heated reactors, as are used according to the invention, since combustible gases emerging in the form of a hydrocarbon-steam mixture from the reaction tubes in fired reactors are reacted immediately and continuously through the combustion taking place in the reactor vessel or a corresponding combustion chamber, or since a significantly reduced oxygen content is present in other regions of the reactor vessel due to the combustion taking place, and the gas space surrounding the reaction tubes is thus already substantially "inertized." In contrast, in the case of purely electrical heating, corresponding combustible gases could accumulate in the reactor vessel and there, at the normal oxygen content of the air and temperatures above the spontaneous ignition temperature, reach the explosion or detonation limit, for example. In the case of combustion without detonation as well, a complete or incomplete combustion results in an energy input, and thus possibly overheating. Together with the gas volume flowing out of the reaction tubes, the complete or incomplete combustion per se can also lead to a significant pressure increase. This pressure increase is reduced, because the burning of the exiting gas mixture is prevented or at least greatly restricted by the use of an inerting gas.

However, by specifically feeding the inerting gas into the connection chamber or (at least) by applying the inerting gas to the connection chamber, the invention achieves the already mentioned further advantage consisting in the sealing of the wall between the connection chamber and the reactor vessel not having to be designed to be completely gas-tight, which could only be carried out with very high material outlay, e.g., the use of temperature-resistant bellows structures and the like, due to the high temperatures. As a result of the advantageous continuous outflow of inerting gas from the connection chamber into the reactor vessel, convective heat dissipation can also be achieved, and thus cooling of the connection chamber or support of an existing cooling can be achieved.

It is advantageous, as mentioned, that at most very small compensation movements occur outside the connection chamber and the reactor vessel. Therefore, according to one embodiment of the invention, the reactor vessel and the connection chamber are together encased in a gas-tight manner, with the optional exception of one or more target outlets—for example, in the form of one or more chimneys. In this case, the term, "target outlet," is intended to mean an outlet which is open or openable in a targeted manner for the gas escape, e.g., a permanently opened outlet opening or a gas outlet flap which can be opened by an increased internal pressure and acts as a check valve. A "target outlet" differs from openings that result from unavoidable leaks. The gas-tight encasement can be provided using a separate outer container (containment), which again separately surrounds the reactor vessel and the connection chamber, each of which has its own outer walls. However, it may also be advantageous to design the outer walls of the reactor vessel and the connection chamber to be gas-tight, except for the wall in which the rod-shaped sections of the power input elements are received in the wall passages in a longitudinally-movable manner, and, again, except for the target outlet(s).

As mentioned, the reactor vessel may have one or more target outlets, which may be connected to one or more chimneys. One or more chimneys can in this case have a dimensioning which makes it possible to relieve an overpressure occurring due to the effects mentioned, and, as a result of the chimney effect, to achieve a slight negative pressure in the reactor vessel. A system, which has been inertized up to a certain degree and is "open" to the environment (as a result of the chimney(s)), can limit the pressure increase rate within the reactor vessel, in the case of an escape of hydrocarbons as a result of damage to the reaction tube(s), to a tolerable amount. The use of inerting gas in the manner according to the invention, which comprises continuous flushing with a comparatively small amount of inerting gas, ensures that there is no backflow of ambient air into the reactor vessel and the connection chamber. In addition, small, false air entries due to insufficient sealing can be compensated for in this way.

The proposed concept of the chambers filled with inert gas (reactor vessel and connection chamber) makes it possible to reduce the oxygen content in these chambers. As can be utilized according to the invention, the reaction rate of the escaping hydrocarbons, and thus the significant additional volume increase rate (as a consequence of the reaction heat input), correlates in a first approximation with the oxygen partial pressure. This correlation is summarized in Table 1 below, wherein $\gamma O_2$ denotes the oxygen partial pressure and $V_{reac}$ the reaction-related volume increase rate.

| $\gamma O_2$ [vol %] | $V_{reac}$ [m³/s] |
| --- | --- |
| 21 | 218 |
| 15 | 156 |
| 10 | 104 |
| 5 | 52 |
| 3 | 31 |
| 1 | 10 |
| 0.1 (almost inert) | 1 |

The maximum permissible pressure $p_{max}$ follows from the mechanical stability of the respective chambers or of a surrounding containment. This pressure must be at least as large as the pressure $p_{box}$ in the case of a coil shredder or in the case of a corresponding other safety-relevant event, which in turn depends upon the volume $V_{box}$ of the relevant chambers, the chimney diameter $D_{chimney}$, and the oxygen partial pressure:

$$p_{max} \geq p_{box} = f(V_{box}, D_{chimney}, \gamma O_2)$$

This requirement results in a design basis for the dimensioning of the chimney, i.e., the open connection to the environment, and vice versa. This relationship is explained again below in FIG. 6. If, for example, a maximum permissible pressure increase of 20 mbar is used as a basis here, as illustrated by the dashed lines 601 and 602 in FIG. 6, in order to be able to use a chimney with a diameter of 500 mm (dashed line 601), a reaction-related volume increase rate of only approximately 10 m³/s may result, which leads to a maximum oxygen content of approximately 1%, which is adjusted by the inertization. Conversely, if an inertization to an oxygen content of at most 1% is to be carried out, a chimney diameter of at least 500 mm must thus be used. In order to be able to use a chimney with a diameter of 900 mm (dashed line 602), a reaction-related volume increase rate of only approximately 42 m³/s may result, which leads to a maximum oxygen content of approximately 4%, which is adjusted by the inertization. Conversely, and analogously to the explanations above, if an inertization to an oxygen content of at most 4% is to take place, a chimney diameter of at least 900 mm must therefore be used here.

The smaller the oxygen content in the relevant chambers, the smaller the volume increase is. Consequently, the diameter of the emergency chimney that must discharge the additional volume can also be smaller. Important for an efficient limitation of the oxygen content is always sufficiently good sealing with respect to the environment, in order to prevent the entry of oxygen-containing false air as far as possible or in a sufficient manner.

In other words, within the framework of the invention, a maximum oxygen content in the reaction vessel and/or in the connection chamber is thus adjusted by means of the inerting gas, which maximum oxygen content is selected on the basis of a dimensioning of the chimney or the chimneys, or the gas feed means are set up for feeding inerting gas or for adjusting the oxygen content on this basis.

An amount of the inerting gas fed in can be regulated by corresponding regulating means—in particular, on the basis of an oxygen measurement in the one or more chimneys—as a result of which the oxygen content can be kept constant during operation. A corresponding safety concept can, for example, also comprise that operation of the reactor be or continue to be prevented when the measured oxygen content exceeds a target oxygen content. For example, a feeding of hydrocarbons into the reaction tubes and/or the heating thereof can be released only when a required oxygen content is undershot. When a fault is detected, the reaction operation with hydrocarbon addition into the reaction tubes can, in general, be prevented.

An impermissible escape of gas from the reaction tubes can be detected, for example, via pressure measuring sensors, wherein a feeding of hydrocarbons into the reaction tubes can be prevented when gas escape is detected, in order to minimize the total amount of escaping hydrocarbons.

For detecting very small damage (leakage flow without drastic pressure increase), the hydrocarbon content in the chimney(s) (for example, in the form of a carbon monoxide equivalent) can also be measured continuously. An impermissible value can likewise result in the prevention of the hydrocarbon feed.

The invention can thus encompass, more generally speaking, that a value that characterizes a gas escape from the one or more reaction tubes be determined in the one or more chimneys on the basis of a pressure and/or hydrocarbon measurement, and that one or more safety measures be initiated if the value exceeds a predetermined threshold value.

According to one embodiment of the invention, cooling panels through which a cooling fluid can flow can be provided in the connection chamber and are arranged between at least two or between at least two groups of the rod-shaped sections that project into the connection chamber.

The cooling panels in this embodiment of the invention are, advantageously, designed to be flat at least in one section, i.e., they extend between two boundary surfaces arranged at a distance from one another, wherein the distance of the boundary surfaces defines a thickness of the cooling panels, and an extension along the boundary surfaces is more than twice, five times, ten times, or twenty times greater than the thickness. The boundary surfaces can be planar or curved boundary surfaces so that the cooling panels can be flat and planar, but they can also be curved so that the cooling panels in this case can be flat and semi-cylindrically or partially cylindrically curved. Different cooling panels can also be dimensioned or designed differently. The "boundary surfaces" are surfaces that define the maximum thickness of the cooling panels. The cooling panels do not have to rest against these boundary surfaces over the entire surface.

These dimensions apply individually to each of the cooling panels, i.e., a first cooling panel can be arranged to be oblique or perpendicular to a second cooling panel. Several cooling panels can be rotated relative to one another in particular about an axis that is parallel to the longitudinal extension direction of the rod-shaped sections of the power input elements and perpendicular to the wall of the reactor vessel.

The cooling panels can in particular be configured for the cooling fluid to flow through in a direction that corresponds overall to a direction perpendicular or parallel to the rod-shaped sections, e.g., through corresponding feed and removal openings for the cooling fluid on sides that are parallel to the rod-shaped sections.

The thickness of the cooling panels can be in the range of 0.5 cm to 10 cm, and in particular of 1 cm to 5 cm, at least in the section dimensioned as mentioned.

In particular, the connection chamber in this embodiment of the invention can have side walls, extending perpendicularly to the wall of the reactor vessel, through which the rod-shaped sections of the power input elements run in the wall passages in each case. One or more further cooling panels can be arranged on or parallel to at least one of the side walls. Like the previously mentioned cooling panels, these cooling panels can be designed with basic dimensioning.

In particular, the connection chamber can also have a bottom wall, which extends in parallel to the wall of the reactor vessel through which the rod-shaped sections of the power input elements run in each case in the wall passages, wherein the previously described elements are arranged between the mentioned wall of the reactor vessel and the bottom wall of the connection chamber. The bottom wall can be designed at least partially as a hollow wall and be set up for the mentioned or a further cooling fluid to flow through.

In the invention, the described cooling, in addition to the corresponding dimensioning and design of the power input elements themselves, ensures that sufficiently low temperatures—in particular, for connecting highly conductive and/or flexible contact elements—are maintained overall.

In particular, in coordination with the inertization proposed according to the invention, the operational safety can be significantly increased, since exceeding critical temperatures can be reliably prevented.

According to the invention, as mentioned, the rod-shaped sections of the power input elements are each guided in a longitudinally-movable manner in their wall passages through the wall of the reactor vessel. A freedom of movement ensured in this way is particularly advantageous for the mechanical behavior of the reaction tubes, which is dominated primarily by the thermal expansion of the tubes by several decimeters during operation of the reactor. Due to the freedom of movement, the bending load on the reaction tubes that would occur with a rigid fastening is reduced. On the other hand, as also mentioned below, the reaction tubes can be fastened with a rigid star bridge to the reactor roof in the second region in the case of alternating current heating, so that a stable suspension is given in this way even in the case of a corresponding longitudinal mobility of the rod-shaped sections of the power input elements. Due to their advantageous dimensioning with a sufficiently high line cross-section, the rod-shaped sections of the power input elements ensure the secure lateral guidance of the reaction tubes. On the other hand, as mentioned, by means of the connection in the cooling chamber—in particular, via flexible contact elements—the components exiting from the cooling chamber to the environment now have very small compensation movements. The inertization according to the invention simplifies this embodiment, as mentioned several times, since the wall passages themselves do not have to be gas-tight.

The invention can be used with reaction tubes and reactors, as are used for steam cracking, and which have several U-bends in the reactor vessel. However, the invention can also be used in other reactor types, as they are used, for example, as mentioned, for steam reforming, wherein the reaction tubes do not have any U-bends in the reactor vessel. The reactor proposed according to the invention can be used for carrying out any endothermic chemical reaction.

The invention also relates to a method for carrying out a chemical reaction using a reactor having a reactor vessel and one or more reaction tubes, wherein one or more power input elements are guided into the reactor vessel for the electrical heating of the one or more reaction tubes.

According to the invention, a reactor is used, with which the one or more power input elements each have a rod-shaped section, and the rod-shaped section or sections each run in a respective wall passage through a wall of the reactor vessel.

A connection chamber into which the rod or rod-shaped section(s) project is located outside the reactor vessel and adjacent to the wall of the reactor vessel in which the wall passage(s) are formed. Gas feed means are provided, which are set up to apply an inerting gas to the connection chamber, and the wall passage(s) with the rod-shaped section(s) received therein in a longitudinally-movable manner are designed to be gas-permeable so that at least a portion of the inerting gas fed into the connection chamber flows into the reactor vessel.

In a particularly preferred embodiment of the invention, a reactor is used, in which a number of tube sections of the one or more tube sections run in each case between a first region and a second region in the reactor vessel, and wherein the first regions for heating the tube sections are each electrically connected to one or more power connections of a current source.

In this embodiment, a reactor is used, which in the first region has power input arrangements, to which a respective one or a respective group of the tube section(s) is electrically connected, and which each have one of the power input elements with the rod-shaped section(s) that each run at the wall passages through a wall of the reactor vessel. A connection chamber, into which the rod-shaped sections project, is arranged outside the reactor vessel and adjacent to the wall of the reactor vessel through which the rod-shaped sections run in their wall passages. The rod-shaped sections are received in the wall passages in a longitudinally-movable manner. The wall passages with the rod-shaped sections received therein in a longitudinally-movable manner are gas-permeable, and means are also provided according to the invention which are set up to apply an inerting gas to the connection chamber, and to allow the inerting gas at least in part to flow out through the wall passages into the reactor vessel.

For further features and advantages of a corresponding method, in which a reactor according to one of the previously explained embodiments of the invention is advantageously used, reference is made to the above explanations.

The invention will be further elucidated below with reference to the accompanying drawings, which illustrate embodiments of the present invention with reference to and in comparison with the prior art.

In the figures, elements that correspond to one another functionally or structurally are indicated by identical reference symbols and for the sake of clarity are not repeatedly explained. If components of devices are explained below, the corresponding explanations will in each case also relate to the methods carried out therewith, and vice versa. The description of the figures repeatedly refers to alternating current heating. As mentioned, however, the invention is also suitable in the same way for the use of direct current for heating. Reference is made here to the above explanations.

Figure 1:
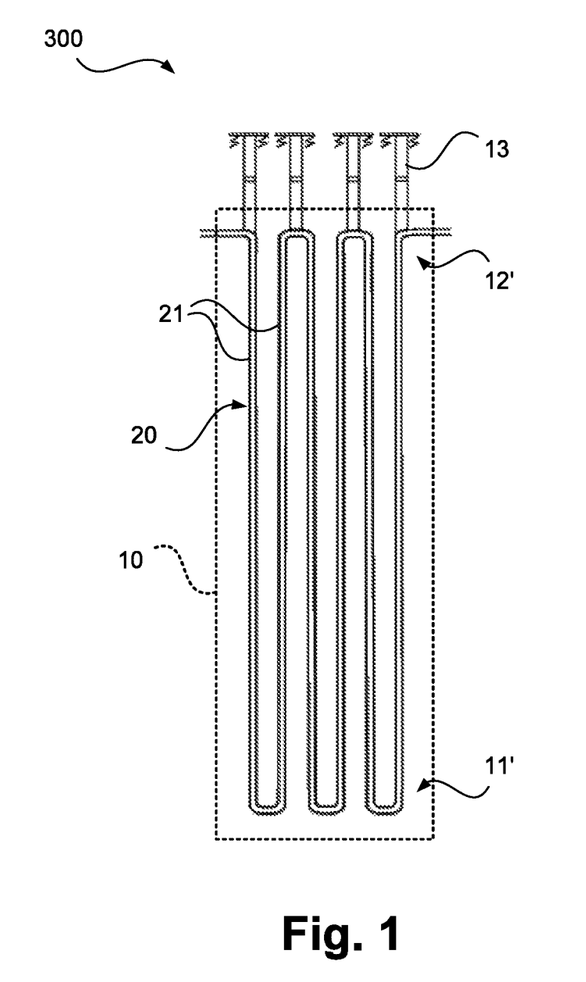
FIG. 1 schematically illustrates a reactor for carrying out a chemical reaction according to an embodiment not according to the invention.

FIG. 1 schematically illustrates a reactor for carrying out a chemical reaction according to an embodiment not according to the invention.

Figure 2:
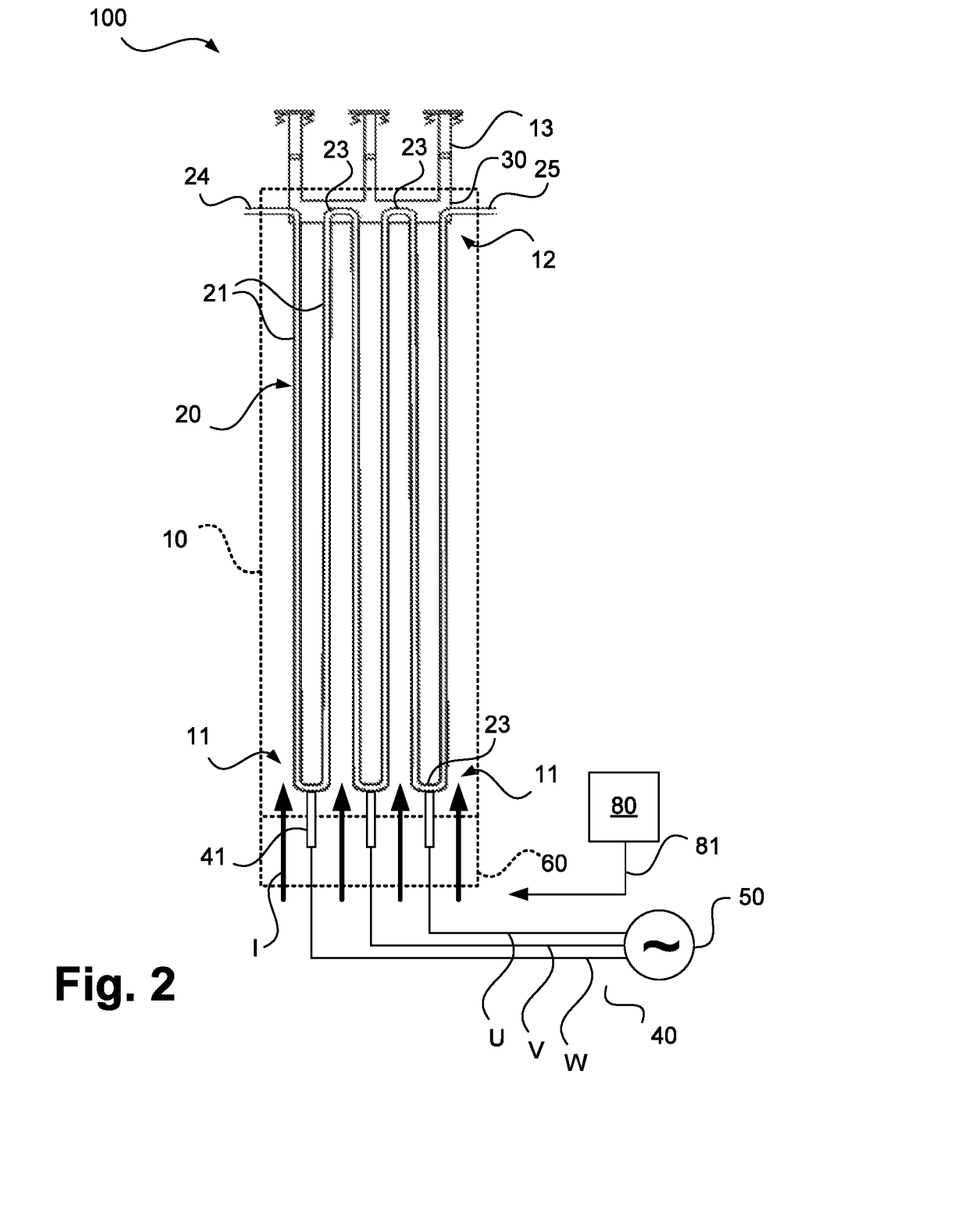
FIG. 2 schematically illustrates a reactor for carrying out a chemical reaction according to an embodiment of the invention.

The reactor here designated 300 is set up to carry out a chemical reaction. For this purpose, it has a reactor vessel 10, which is in particular thermally insulated, and a reaction tube 20, wherein a number of tube sections of the reaction tube 20, which are designated here by 21 only in two cases, run respectively between a first zone 11' and a second zone 12' in the reactor vessel 10. The reaction tube 20, which will be explained in more detail below with reference to FIG. 2, is attached to a ceiling of the reactor vessel or to a support structure by means of suitable suspensions 13. In a lower region, the reactor vessel can in particular have a furnace (not illustrated). It goes without saying that several reaction tubes can be provided in each case, here and subsequently.

FIG. 2 schematically illustrates a reactor for carrying out a chemical reaction according to an embodiment of the invention, which is overall denoted by 100.

The zones previously designated by 11' and 12' here take the form of regions 11 and 12, wherein the tube sections 21 for heating the tube sections 21 in the first regions 11 can in each case be electrically connected to the phase connections U, V, W of a polyphase alternating current source 50. Switches and the like, as well as the specific type of connection, are not illustrated.

In the embodiment of the invention illustrated here, the tube sections 21 are electrically conductively connected to one another in the second regions 12 by means of a connecting element 30, which is integrally connected to the one or more reaction tubes 20 and is arranged within the reactor vessel 10. A neutral conductor may also be connected thereto.

In the reactor 100 illustrated here, several tube sections 21 of a reaction tube 20 (although several such reaction tubes 20 may be provided) are thus arranged side-by-side in the reactor vessel 10. The tube sections 21 pass into one another via U-bends 23 (only partially indicated) and are connected to a feed section 24 and an extraction section 25.

A first group of the U-bends 23 (at the bottom in the drawing) is arranged side-by-side in the first region 11, and a second group of the U-bends 23 (at the top in the drawing) is arranged side-by-side in the second region 12. The U-bends 23 of the second group are formed in the connecting element 30, and the tube sections 21 extend from the connecting element 30 in the second region 12 to the first region 11.

Within the scope of the invention, the use of the connecting element 30 is optional, albeit advantageous. On the other hand, embodiments of the invention, which are explained below, relate in particular to the embodiment of the means for power input in the first region 11. The latter takes place by the use of power input elements 41, which are illustrated here in a highly simplified manner and of which only one is designated.

As explained below in particular also with respect to FIGS. 4A and 4B, the power input elements 41 project into a connection chamber 60. The power input elements 41—more precisely, rod-shaped sections thereof—are received in a longitudinally-movable manner at corresponding wall passages in a wall which separates the reactor vessel 10 and the connection chamber 60, wherein a gas-tight closure does not result here. As indicated by arrows I (only one arrow is accordingly denoted), an inerting gas is provided which is fed into the connection chamber 60 and passes into the reactor vessel 10 via the wall passages, in which the power input elements 41 are received in a longitudinally-movable manner. In order to provide and feed the inerting gas, suitable gas feed means are provided, which are greatly simplified here, denoted by 80, and which comprise, for example, one or more gas tanks and corresponding lines 81.

Figure 3:
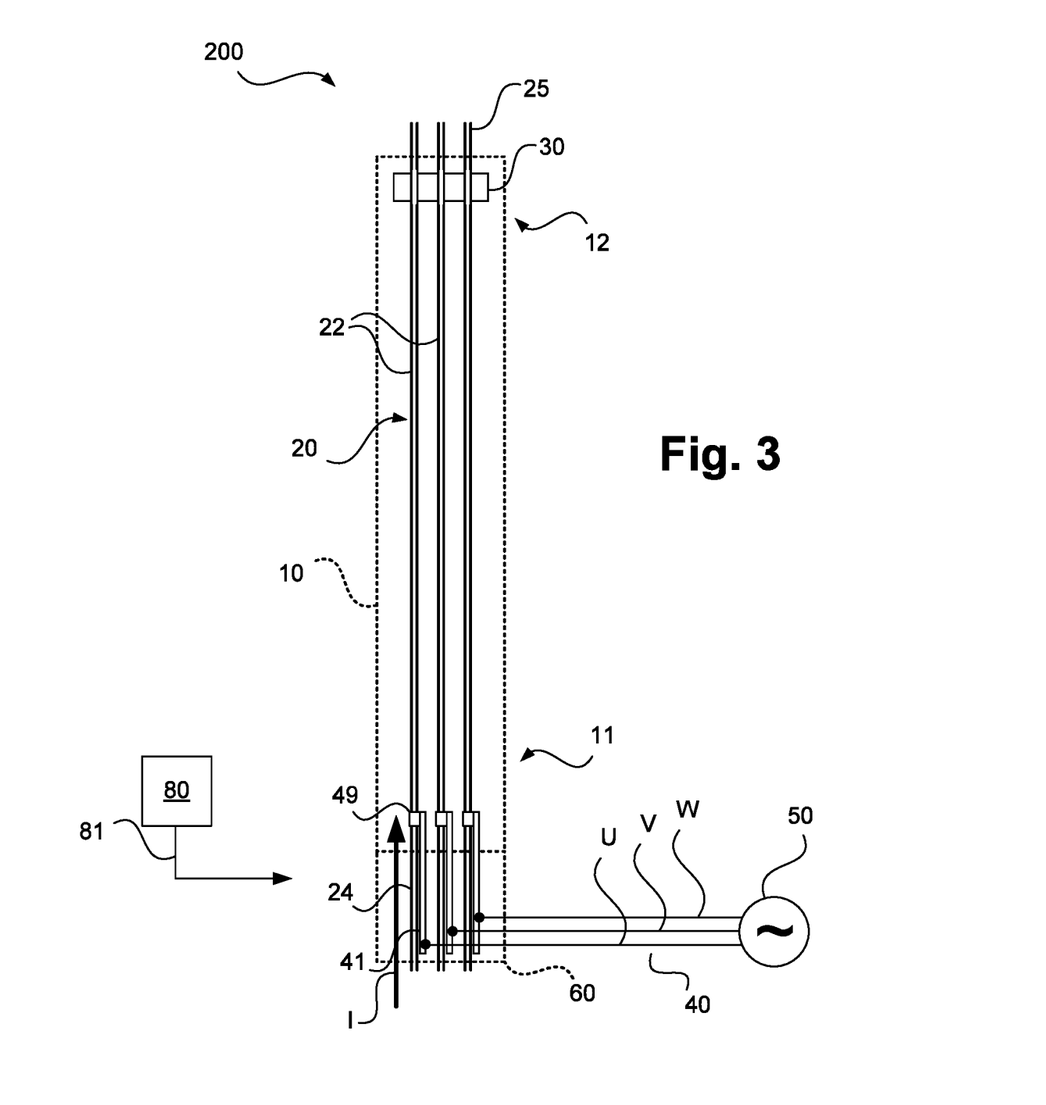
FIG. 3 schematically illustrates a reactor for carrying out a chemical reaction according to a further embodiment of the invention.

FIG. 3 schematically illustrates a reactor for carrying out a chemical reaction according to an embodiment of the invention, which is overall denoted by 200.

In the reactor 200, the tube sections—here, by contrast, denoted by 22—in each case comprise a tube section 22 consisting of several reaction tubes 20, wherein the tube sections 22 are arranged side-by-side in the reactor vessel 10 in a non-fluidically-connected manner and are in each case connected to feed sections 24 and extraction sections 25. For the remaining elements, reference is expressly made to the above explanations relating to the preceding figures.

Again, the use of a connecting element 30 within the scope of the invention is optional, albeit advantageous. Here as well, power input elements 41 and the connection chamber 60 are illustrated in a greatly simplified manner. The feeding of the inerting gas I takes place here as substantially explained above. The power input elements can have a sleeve-like region 49, which are placed in the first region 11 around the reaction tubes 20 or the tube sections.

Figure 4A:
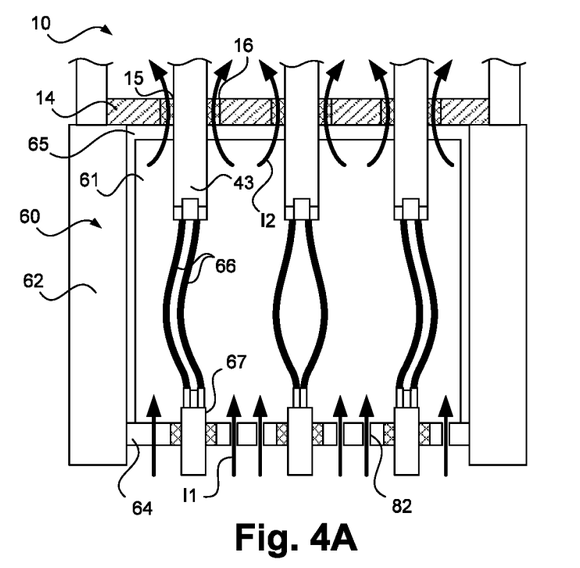
FIGS. 4A and 4B show partial views of reactors for carrying out a chemical reaction according to a further embodiment of the invention.
Figure 4B:
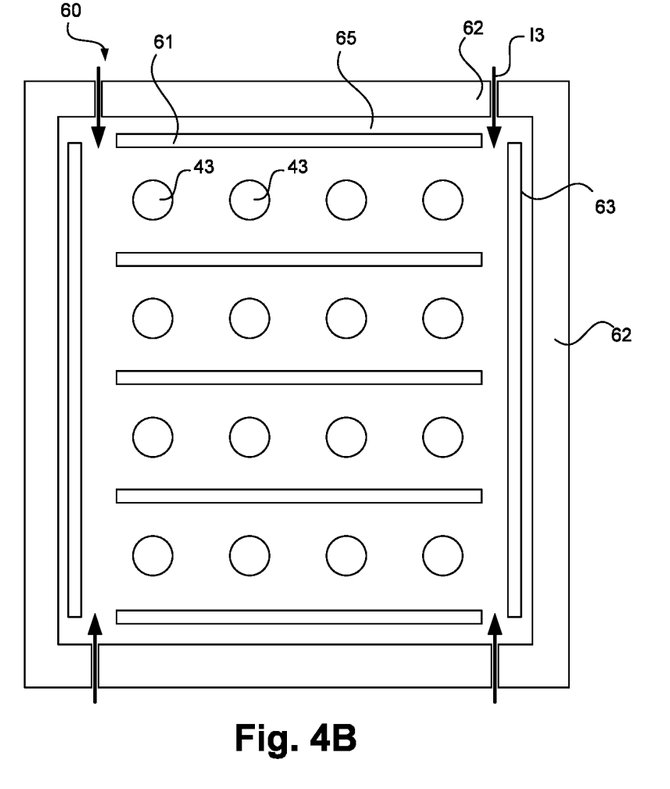

FIGS. 4A and 4B show partial views of reactors 100 with connection chambers 60 according to embodiments of the invention in longitudinal section (FIG. 4A) and cross-section (FIG. 4B), wherein, in cross-section (FIG. 4B), only some selected elements are illustrated. FIGS. 4A and 4B are in particular greatly simplified insofar as a significantly larger number of the elements illustrated in each case here can be provided in real reactors.

As can be seen in particular in FIG. 4A, the rod-shaped sections 43 of the power input elements each run in the wall passages 15 through the wall 14 of the reactor vessel 10. The rod-shaped sections 43 are each received in a longitudinally-movable manner, as mentioned several times, and no gas-tight closure is present at the wall passages 15. The connection chamber 60, into which the rod-shaped sections 43 project, is arranged outside the reactor vessel 10 and adjacent to the wall 14 of the reactor vessel 10 through which the rod-shaped sections 43 run in their wall passages 15. Since no gas-tight closure is formed in the wall passages 15, inerting gas, which is fed into the connection chamber via suitable openings 82 or nozzles, as illustrated by arrows 11, can flow into the reactor vessel, as illustrated by arrows 12. As illustrated by arrows 13 in FIG. 4B, inerting gas can also be fed laterally into the connection chamber 60.

Cooling panels 61 can be provided in the connection chamber 60 and can be arranged as apparent in particular in FIG. 4B. A cooling fluid can flow through them, and they can be arranged between at least two or between at least two groups of the rod-shaped sections 43 that project into the connection chamber 60.

The connection chamber 60 has side walls 62 that extend in each case perpendicularly to the wall 14 of the reactor vessel 10 through which the rod-shaped sections 43 run, wherein, as can be seen in FIG. 4B and as not separately shown in FIG. 4A, one or more further cooling panels 63 can also be arranged on at least one of the side walls 62.

The connection chamber 60 has a bottom wall 64 that is shown in FIG. 4A and extends in parallel to the wall 14 of the reactor vessel 10 through which the rod-shaped sections 43 run, wherein the bottom wall 64 is formed at least in one section as a hollow wall, and is likewise set up for a cooling fluid to flow through. The connection chamber 60 is designed without devices for providing forced convection in a gas atmosphere 65 surrounding the cooling panels 61 and the rod-shaped sections 43.

In the connection chamber 60, flexible connecting elements illustrated as strands 66 in FIG. 4A are connected to the rod-shaped sections 43 and are fastened with an end that is not connected to the rod-shaped sections 43 to rigid contact elements 67 that are arranged immovably in the connection chamber 60 and fastened here in insulating and gas-tight receptacles in the bottom 64 (without more detailed designation).

Figure 5:
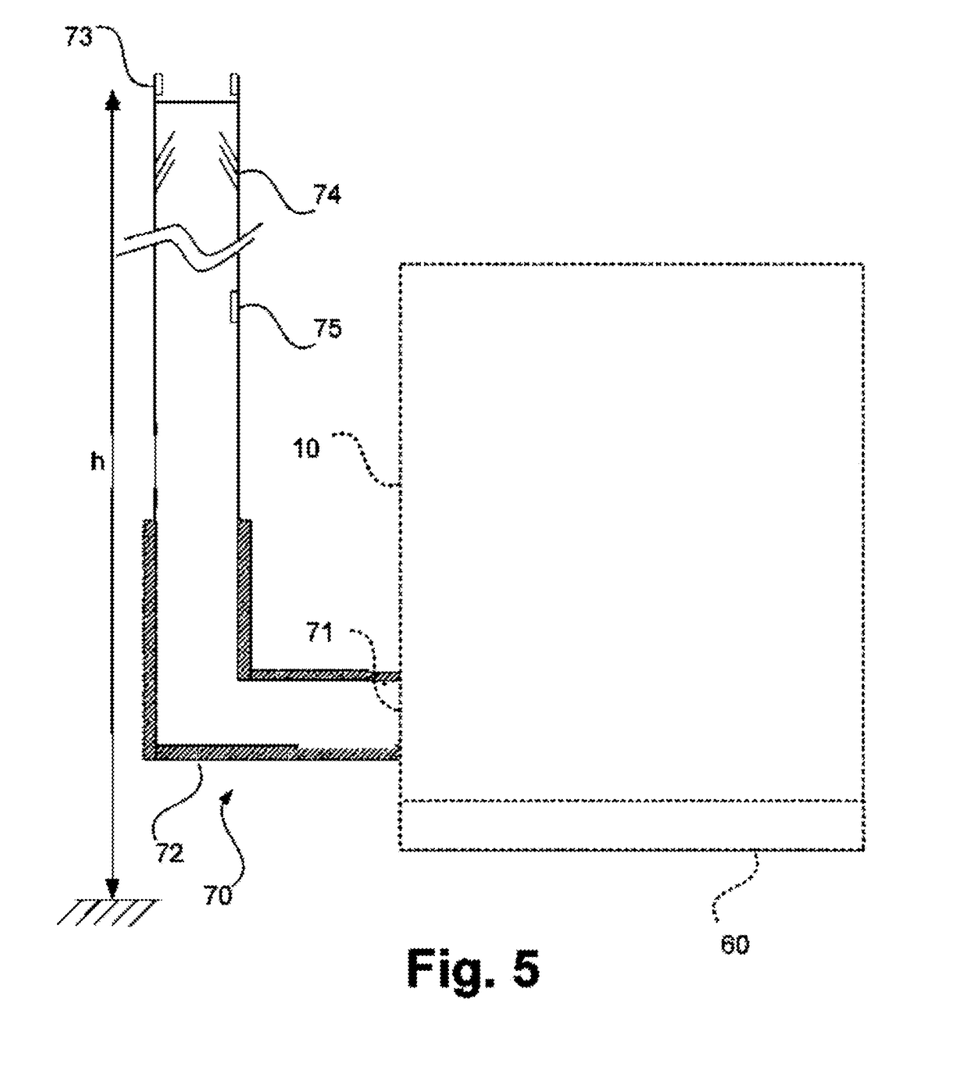
FIG. 5 schematically illustrates a reactor for carrying out a chemical reaction according to a further embodiment of the invention.

FIG. 5 schematically illustrates a reactor for carrying out a chemical reaction according to a further embodiment of the invention in an extension to the illustration according to the preceding figures, wherein the elements already illustrated above in FIG. 2 are, in part, not illustrated again. These elements may all be part of the reactor illustrated in FIG. 5. In FIG. 5, in particular the reactor vessel 10 and the connection chamber 60 are shown in a greatly simplified manner.

As illustrated here, the reactor vessel 10 is connected via a target outlet 71 to a chimney 70, which has a suitable insulation 72 in a region adjoining the reactor vessel 10. The chimney 70 can have a height h in relation to the ground of, for example, 20 to 50 meters in order to be able to dissipate escaping hydrocarbons to a safe location in the case of an accident. A so-called velocity seal 74 can likewise be provided, as can one or more sensors for detecting an oxygen and/or hydrocarbon content in the chimney gas.

Optionally, in the region of the chimney outlet, ignition devices or pilot burners 73 can additionally be installed in order to at least partially prevent the escape of uncombusted hydrocarbons into the atmosphere in the event of a disaster.

Figure 6:
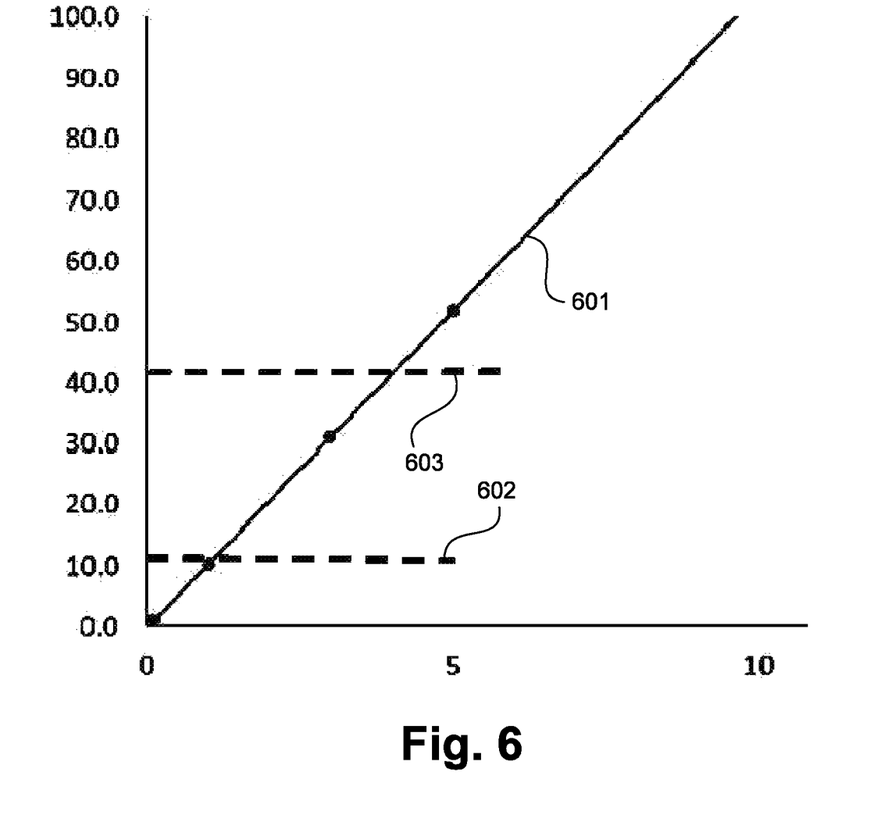
FIG. 6 schematically illustrates principles of dimensioning a chimney according to an embodiment of the invention.

FIG. 6 schematically illustrates the principles of chimney dimensioning according to an embodiment of the invention in the form of a diagram, in which an oxygen content in percent is plotted on the abscissa, and a reaction-related volume increase rate in $m^3/s$ is plotted on the ordinate. A graph 601 represents the relationship already explained above with reference to the table. A dashed line 602 denotes values required for a maximum pressure increase of 20 mbar in the case of a chimney diameter of 500 mm; a dashed line 603 denotes corresponding values in the case of a chimney diameter of 900 mm.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. Further, it will be understood that certain features and subcombinations are of utility and may be employed within the scope of the disclosure. Further, various steps set forth herein may be carried out in orders that differ from those set forth herein without departing from the scope of the claimed methods. The specification shall not be restricted to the above embodiments. Any units of measurements provided herein are exemplary only and are not meant to specifically define the dimensions of the system.

The invention claimed is:

1. A reactor for carrying out a chemical reaction, the reactor comprising:
   a reactor vessel; and
   one or more reaction tubes;
   wherein;
   one or more power input elements are guided into the reactor vessel for electrical heating of the one or more reaction tubes;
   the one or more power input elements each have a rod-shaped section, and the rod-shaped section or sections each run in a respective wall passage through a wall of the reactor vessel;
   a connection chamber into which the rod-shaped section(s) project is located outside the reactor vessel and adjacent to the wall of the reactor vessel in which the wall passage(s) are formed;
   gas feed means are provided, which are set up to apply inerting gas to the connection chamber; and
   the wall passage(s) with the rod-shaped section(s) received therein in a longitudinally-movable manner are designed to be gas-permeable so that at least a portion of the inerting gas fed into the connection chamber flows into the reactor vessel.

2. The reactor according to claim 1, in which tube sections of the one or more reaction tubes each run between a first region and a second region in the reactor vessel, and the tube sections in the first region for electrical heating of the tube sections are each electrically connected or connectable to power connections of a power source; wherein power input arrangements to which a respective one or a respective group of the tube section(s) is electrically connected are provided in the first region, wherein the power input arrangements each have one of the power input elements with the rod-shaped sections, each of which runs in the wall passages through the wall of the reactor vessel.

3. The reactor according to claim 1, in which the gas feed means are set up to provide, as the inerting gas, a gas or a gas mixture which has nitrogen, carbon dioxide, and/or argon in a respectively superatmospheric content.

4. The reactor according to claim 1, in which the reactor vessel and the connection chamber are together encased in a gas-tight manner, with the exception of one or more target outlets.

5. The reactor according to claim 4, in which the one or more target outlets are connected to one or more chimneys.

6. The reactor according to claim 5, in which the gas feed means are set up to adjust a maximum oxygen content in the reaction vessel and the connection chamber on the basis of a dimensioning of the chimney(s).

7. The reactor according to claim 6, in which the gas feed means are set up to regulate an amount of inerting gas on the basis of an oxygen measurement in the one or more chimneys.

8. The reactor according to claim 7, which has means set up to prevent a reaction operation with hydrocarbon addition into the reaction tubes when the measured oxygen content exceeds a target oxygen content.

9. The reactor according to claim 5, which has means set up to prevent a reaction operation with hydrocarbon addition into the reaction tubes when a pressure in the reactor vessel and a hydrocarbon content in the chimney exceeds a predetermined value.

10. The reactor according to claim 1, in which cooling panels through which a cooling fluid can flow are provided in the connection chamber and are arranged between at least two or between at least two groups of the rod-shaped sections that project into the connection chamber.

11. The reactor according to claim 5, in which the gas feed means are set up to adjust a maximum oxygen content in the reaction vessel or the connection chamber on the basis of a dimensioning of the chimney(s).

12. The reactor according to claim 11, in which the gas feed means are set up to regulate an amount of inerting gas on the basis of an oxygen measurement in the one or more chimneys.

13. The reactor according to claim 5, which has means set up to prevent a reaction operation with hydrocarbon addition into the reaction tubes when a pressure in the reactor vessel or a hydrocarbon content in the chimney exceeds a predetermined value.

14. The reactor according to claim 6, which has means set up to prevent a reaction operation with hydrocarbon addition into the reaction tubes when a pressure in the reactor vessel or a hydrocarbon content in the chimney exceeds a predetermined value.

15. The reactor according to claim 7, which has means set up to prevent a reaction operation with hydrocarbon addition into the reaction tubes when a pressure in the reactor vessel or a hydrocarbon content in the chimney exceeds a predetermined value.

16. The reactor according to claim 8, which has means set up to prevent a reaction operation with hydrocarbon addition into the reaction tubes when a pressure in the reactor vessel or a hydrocarbon content in the chimney exceeds a predetermined value.

17. A method for carrying out a chemical reaction, comprising:
- providing a reactor, comprising:
  - a reactor vessel; and
  - one or more reaction tubes, wherein one or more power input elements are guided into the reactor vessel for electrical heating of the one or more reaction tubes;
  - wherein:
    - the one or more power input elements each have a rod-shaped section, and the rod-shaped section or section(s) each run in a respective wall passage through a wall of the reactor vessel;
    - a connection chamber into which the rod-shaped section(s) project is located outside the reactor vessel and adjacent to the wall of the reactor vessel in which the wall passage(s) are formed;
    - gas feed means are configured to apply inerting gas to the connection chamber; and
    - the wall passage(s) with the rod-shaped section(s) received therein in a longitudinally-movable manner are designed to be gas-permeable so that at least a portion of the inerting gas fed into the connection chamber flows into the reactor vessel; and
- operating the reactor to carry out a chemical reaction.

18. The method according to claim 17, wherein:
- tube sections of the one or more reaction tubes each run between a first region and a second region in the reactor vessel;
- the tube sections in the first region for heating of the tube sections are each electrically connected to power connections of a power source;
- power input arrangements to which a respective one or a respective group of the tube section(s) is electrically connected are provided in the first region and which each have one of the power input elements with the rod-shaped sections, each of which runs in wall passages through a wall of the reactor vessel.

* * * * *